(12) United States Patent
Sanville et al.

(10) Patent No.: US 10,941,884 B2
(45) Date of Patent: Mar. 9, 2021

(54) FLUID CONDUIT AND METHOD

(71) Applicant: Eaton Intelligent Power Limited, Dublin (IE)

(72) Inventors: Anthony J. Sanville, Herndon, VA (US); Emmanuel Matthews, Laurel, MD (US); Richard M. De Luna, Oak Park, MI (US)

(73) Assignee: Eaton Intelligent Power Limited, Dublin (IE)

( * ) Notice: Subject to any disclaimer, the term of this patent is extended or adjusted under 35 U.S.C. 154(b) by 116 days.

(21) Appl. No.: 16/114,817

(22) Filed: Aug. 28, 2018

(65) Prior Publication Data

US 2019/0061312 A1 Feb. 28, 2019

Related U.S. Application Data

(60) Provisional application No. 62/551,263, filed on Aug. 29, 2017.

(51) Int. Cl.
| | | |
|---|---|---|
| *F16L 9/00* | (2006.01) | |
| *F16L 9/128* | (2006.01) | |
| *F16L 9/04* | (2006.01) | |
| *F16L 55/07* | (2006.01) | |
| *B32B 1/08* | (2006.01) | |
| *B32B 3/26* | (2006.01) | |
| *B32B 5/18* | (2006.01) | |
| *B32B 7/04* | (2019.01) | |
| *F16L 53/75* | (2018.01) | |

(52) U.S. Cl.
CPC .............. *F16L 9/006* (2013.01); *B32B 1/08* (2013.01); *B32B 3/266* (2013.01); *F16L 9/04* (2013.01); *F16L 9/128* (2013.01); *B32B 5/18* (2013.01); *B32B 7/04* (2013.01); *B32B 2597/00* (2013.01); *F16L 53/75* (2018.01); *F16L 55/07* (2013.01)

(58) Field of Classification Search
CPC ..... F16L 9/04; F16L 9/128; F16L 9/21; F16L 53/00; F16L 53/70; F16L 53/75; F16L 55/07
USPC ......... 29/890.049; 138/38, 97, 99, 110, 153, 138/172, 173, 174, 177; 220/661, 673; 285/133.5, 133.11, 197; 165/178

See application file for complete search history.

(56) References Cited

U.S. PATENT DOCUMENTS

| | | | | |
|---|---|---|---|---|
| 290,659 | A * | 12/1883 | Austin | F16L 9/02 138/168 |
| 797,696 | A * | 8/1905 | Litchfield | F16L 57/02 138/172 |
| 1,025,186 | A * | 5/1912 | Hill | F16L 9/22 138/157 |

(Continued)

FOREIGN PATENT DOCUMENTS

EP 2926969 A1 * 10/2015 ............. B33Y 40/00

*Primary Examiner* — Robert K Arundale
*Assistant Examiner* — Richard K. Durden
(74) *Attorney, Agent, or Firm* — Fishman Stewart PLLC

(57) ABSTRACT

A fluid conduit includes a body and a reinforcing portion integrally formed with the body. The reinforcing portion may be disposed at an inner surface of the body. The reinforcing portion may include a grid structure. The grid structure may include a plurality of beams that provide a plurality of rectangular cells. A fluid conduit may be formed via additive manufacturing. A body and a reinforcing portion may be formed as a monolithic component.

20 Claims, 4 Drawing Sheets

(56) References Cited

U.S. PATENT DOCUMENTS

| | | | | |
|---|---|---|---|---|
| 1,195,830 | A * | 8/1916 | McWane, Jr. | F16L 57/02 138/172 |
| 1,518,705 | A * | 12/1924 | Raun | F16L 57/00 138/173 |
| 3,685,547 | A * | 8/1972 | Tuppeny, Jr. | F16K 27/00 138/178 |
| 3,750,709 | A * | 8/1973 | French | B21C 37/15 138/38 |
| 3,791,679 | A * | 2/1974 | Glover | E03F 3/04 285/132.1 |
| 4,320,246 | A * | 3/1982 | Russell | F28D 15/04 136/248 |
| 4,790,356 | A * | 12/1988 | Tash | G01M 3/022 |
| 7,751,190 | B2 * | 7/2010 | Fujiwara | F28D 15/046 165/104.21 |
| 2003/0136455 | A1 * | 7/2003 | Kamiyama | F16L 55/162 138/98 |
| 2011/0029114 | A1 * | 2/2011 | Rose | G06F 30/00 700/97 |
| 2013/0299036 | A1 * | 11/2013 | Loveday | F16L 9/00 138/177 |
| 2016/0003380 | A1 * | 1/2016 | Ott | F16L 9/18 138/149 |

\* cited by examiner

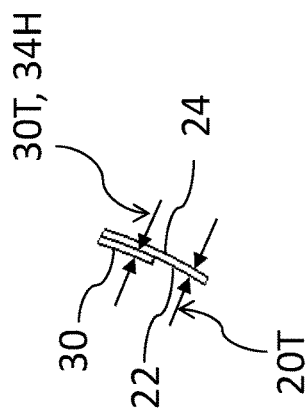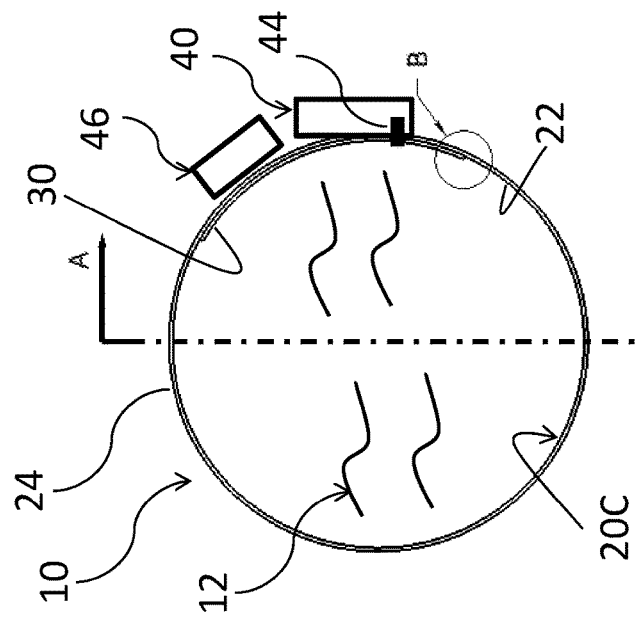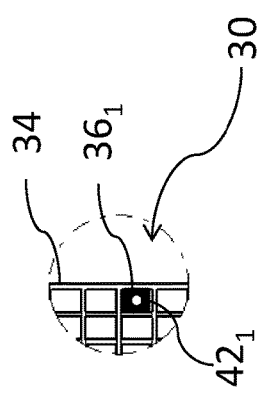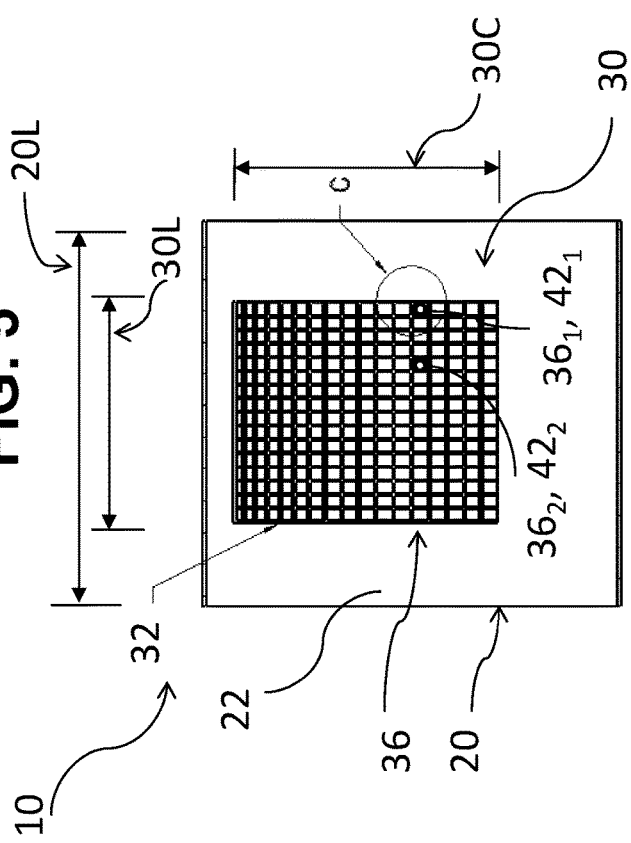

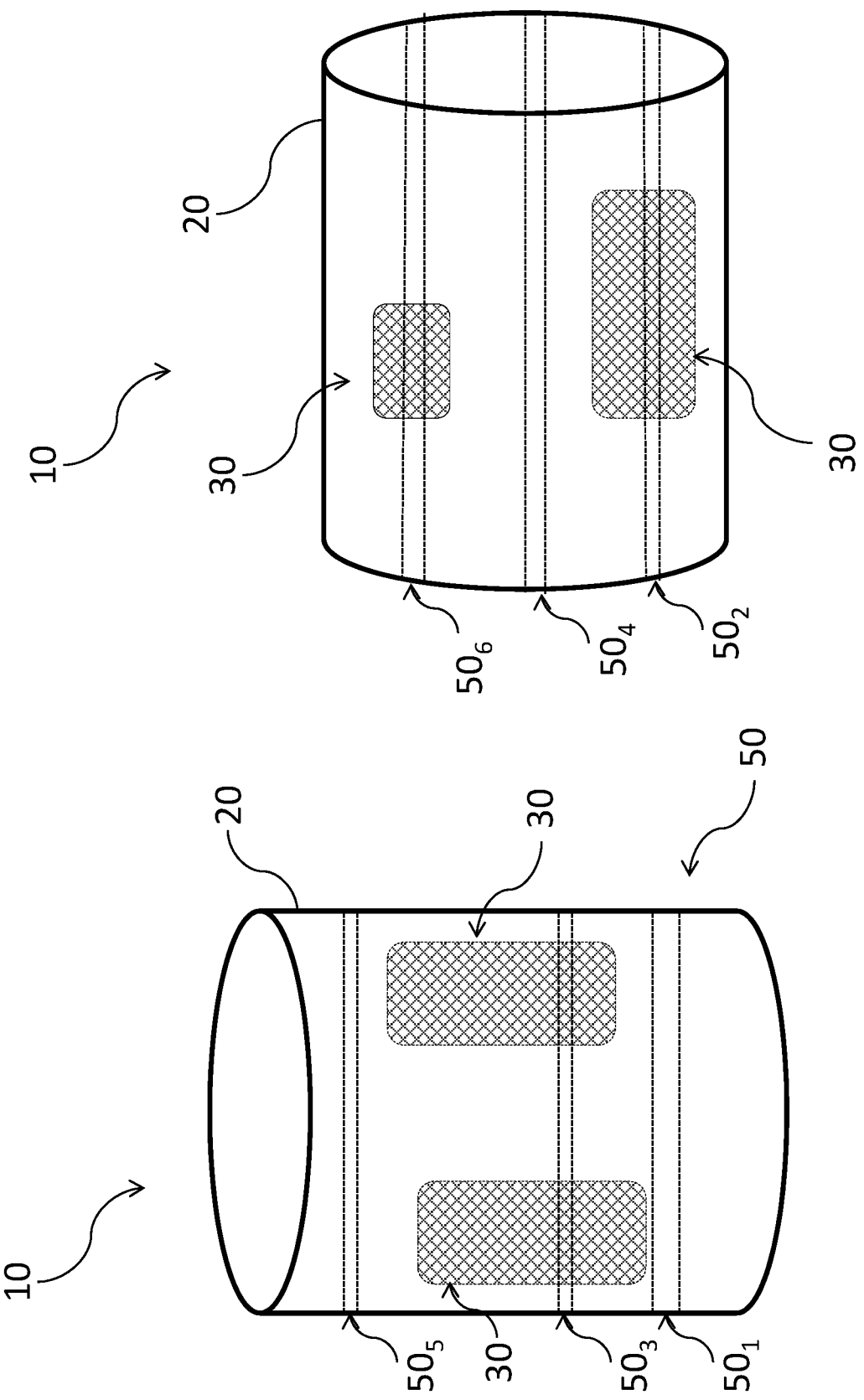

FLUID CONDUIT AND METHOD

CROSS-REFERENCE TO RELATED APPLICATION

This application claims the benefit of U.S. Provisional Patent Application Ser. No. 62/551,263, filed on Aug. 29, 2017, the disclosure of which is hereby incorporated herein by reference in its entirety.

TECHNICAL FIELD

The present disclosure generally relates to fluid conduits, including fluid conduits that may be used in connection with aircraft.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some fluid conduits may not be sufficiently strong, may be heavy, may be large, and/or may involve a complex assembly process.

There is a desire for solutions/options that minimize or eliminate one or more challenges or shortcomings of fluid conduits. The foregoing discussion is intended only to illustrate examples of the present field and should not be taken as a disavowal of scope.

SUMMARY

In embodiments, a fluid conduit may include a body and a reinforcing portion integrally formed with the body. The reinforcing portion may be disposed at an inner surface of the body. The reinforcing portion may include a grid structure. The grid structure may include a plurality of beams that may provide a plurality of rectangular cells. A fluid conduit may be formed via additive manufacturing. A body and a reinforcing portion may be formed as a monolithic component.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 2 is a front view generally illustrating an embodiment of a fluid conduit according to teachings of the present disclosure.

FIG. 3 is a cross-sectional view of the embodiment of FIG. 2 along line A-A.

FIG. 4 is a detail view (Detail B) of the front view of FIG. 2.

FIG. 5 is a detail view (Detail C) of the cross-sectional view of FIG. 3.

FIGS. 6 and 7 are perspective views generally illustrating embodiments of fluid conduits according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
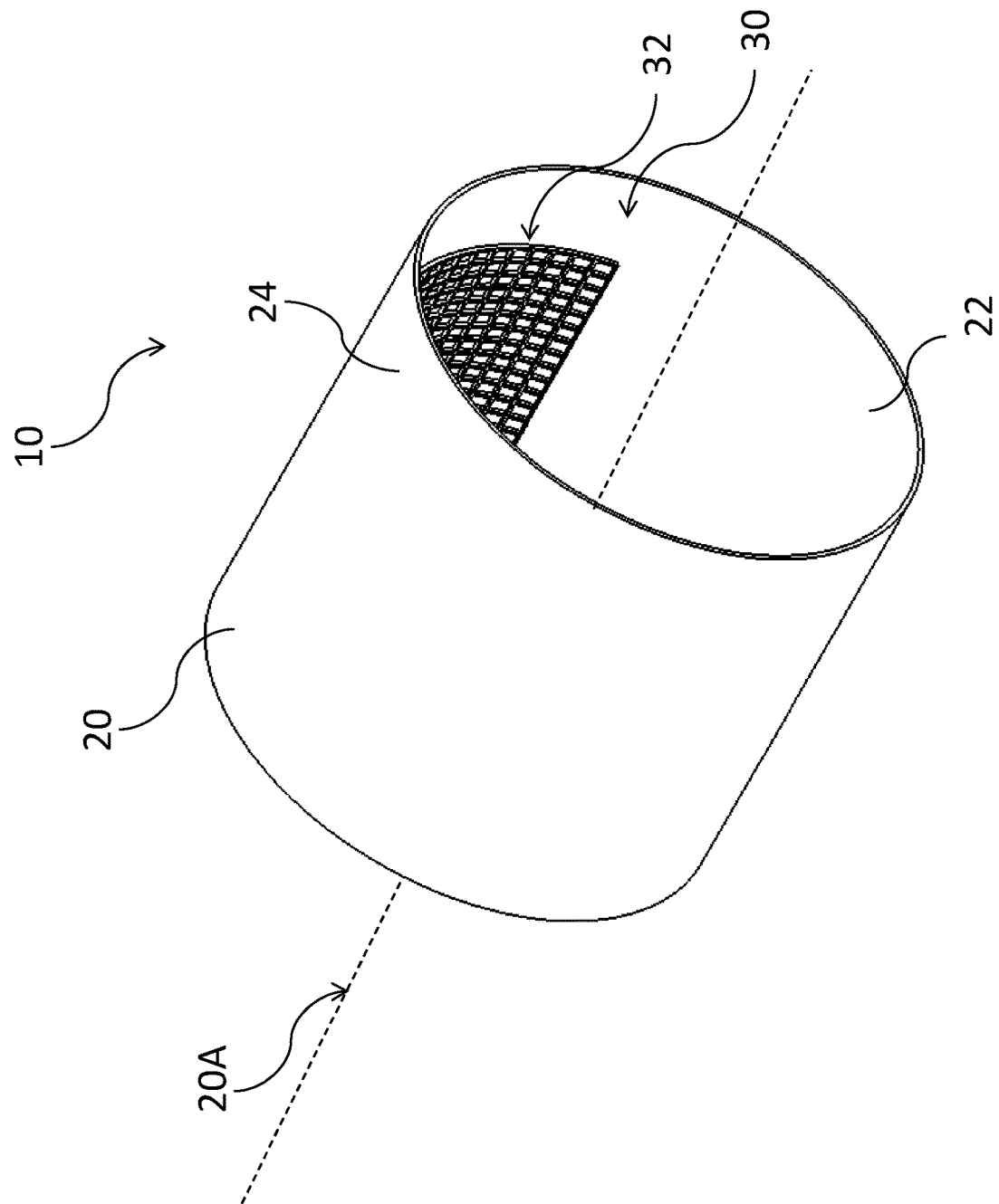
FIG. 1 is a perspective view generally illustrating an embodiment of a fluid conduit according to teachings of the present disclosure.

In embodiments, such as generally illustrated in FIGS. 1, 2, 3, 4, 5, 6, and 7, a fluid conduit 10 may include a body 20 and/or a reinforcing portion 30. A body 20 may include, for example and without limitation, a substantially cylindrical configuration. Additionally or alternatively, a body 20 may include or have other configurations, such as a rectangular configuration. A body 20 may have a longitudinal axis 20A that, as generally illustrated in FIG. 1, may comprise a central or substantially central axis.

With embodiments, a reinforcing portion 30 may be disposed at or about an inner surface 22 of a body 20 and/or a reinforcing portion 30 may be disposed at or about an outer surface 24 of the body 20. A reinforcing portion 30 may include one or more of a variety of shapes, sizes, configurations, and/or materials. For example and without limitation, a reinforcing portion 30 may include a grid structure 32 that may include a plurality of beams 34 that may be interconnected to form a plurality of cells 36. The beams 34 may extend from the inner surface 22 of the body 20 in a substantially radial direction, such as radially inward. The beams 34 may be interconnected to form a plurality of cells 36 that may include one or more shapes. For example and without limitation, the cells 36 may include, without limitation, rectangular, square, and/or triangular shapes/configurations. The beams 34 may have a height or thickness 34H that may correspond to an anticipated or intended amount of bending stress. A height or thickness 34H of beams 34, which may or may not be the substantially the same for each beam 34, may be larger for fluid conduits 10, or sections of fluid conduits 10, for which increased or greater expected amounts of bending stress may occur or may be anticipated to occur. Additionally or alternatively, a height or thickness 34H of beams 34 may be lesser or smaller for fluid conduits 10 or sections of fluid conduits 10 with lesser expected amounts of bending stress. A height or thickness 30T of reinforcing portion 30 (e.g., a maximum height of beams 34) may, for example and without limitation, be at least as thick as a thickness 20T of other portions of body 20 (e.g., a fluid conduit 10 may be twice as thick at or about a reinforcing portion 30).

In embodiments, such as generally illustrated in FIG. 2, a fluid conduit 10 may be connected to or with one or more external components 40, such as a handle. An external component 40 may be connected to the body 20 and/or to a reinforcing portion 30. For example and without limitation, an external component 40 may be connected to an outer surface 24 of the body 20 and may be aligned with (e.g., radially correspond to) a reinforcing portion 30 disposed at an inner surface 22 of the body 20 such that the reinforcing portion 30 may provide additional strength to the body 20 at or about the external component 40.

With embodiments, such as generally illustrated in FIGS. 3 and 5, one or more cells 36 of a grid structure 32 of a reinforcing portion 30 may be at least partially full or filled in (see, e.g., cells $36_1$ and $36_2$). Cells 36 that are at least partially full or filled in (e.g., cells $36_1$ and $36_2$) may be configured for connection with an external component 40. For example and without limitation, cells 36 that are at least partially full or filled in may include a threaded recess or aperture (e.g., threaded apertures $42_1$, $42_2$) that may be configured for connection or engagement with a fastener 44 that may connect an external component 40 with the body 20. In embodiments, a thickness 20T of the body 20, excluding a reinforcing portion 30, may not be thick enough to provide threads for connection with an external components 40, while a thickness of the body 20 and reinforcing portion 30 (e.g., a sum of thickness 20T and height 30T) may be sufficiently thick to provide threads for connection with an external component 40.

With embodiments, a reinforcing portion 30 may extend along an inner surface 22 of the body 20. A reinforcing portion 30 may extend partially or entirely around a perimeter or circumference 20C (e.g., an inner circumference) of the body 20. For example and without limitation, a circumferential extent 30C of a reinforcing portion 30 may be less than half of a circumference 20C of the body 20. In embodiments, a reinforcing portion 30 may extend along all or part of an axial length 20L of a body 20. An axial extent 30L of a reinforcing portion 30 may correspond to a size of an area of anticipated or expected increased stress, for example and without limitation, a shape or extent sufficient to cover a footprint and/or provide reinforcement for an external component 40.

With embodiments, a circumferential extent 30C and/or an axial extent 30L of a reinforcing portion 30 may be relatively small compared to a circumference 20C and/or an axial length 20L of a body 20, which may provide the body 20 with a lower overall weight and sufficient strength in areas of intended or expected increased stress. For example and without limitation, a circumferential extent 30C and/or an axial extent 30L of a reinforcing portion 30 may be less than 50%, less than 25%, less than 10%, and/or less than 1% of a circumference 20C of a body 20 and/or an axial length 20L of body 20, respectively. In embodiments, a circumferential extent 30C and/or an axial extent 30L of a reinforcing portion 30 may be greater than 50% of a circumference 20C of the body 20 and/or an axial length 20L of the body 20, respectively.

In embodiments, a fluid conduit 10 may be configured to act or function as a heat sink. For example and without limitation, an external component 40 may include an electrical component 46 that may be connected to an outer surface 24 of the body 20 such that the electrical component 46 may be at least partially aligned with a reinforcing portion 30 and the reinforcing portion 30 may dissipate heat generated by the electrical component 46 (see, e.g., FIG. 2). Heat generated by the electrical component 46 may be transferred through the body 20 to the reinforcing portion 30 and may be transferred from reinforcing portion 30 to a fluid 12 in the fluid conduit 10 that may be flowing past the reinforcing portion 30. A reinforcing portion 30 may increase a surface area (e.g., a heat transfer surface area) of a fluid conduit 10 relative to fluid conduits without a reinforcing portion 30, which may increase the effectiveness of the fluid conduit 10 as a heat sink. In embodiments, the reinforcing portion 30 may facilitate transfer of heat from a fluid 12 in the fluid conduit 10 to the body 20.

In embodiments, such as generally illustrated in FIGS. 6 and 7, a fluid conduit 10 may include a plurality of reinforcing portions 30 that may be separate from each other (e.g., circumferentially and/or axially spaced) and may be integrally formed with the body 20. With embodiments, a fluid conduit 10 may include one or more reinforcing portions 30 that may be disposed at an outer surface 24 of a body 20 (see, e.g., FIG. 7).

Figure 8:
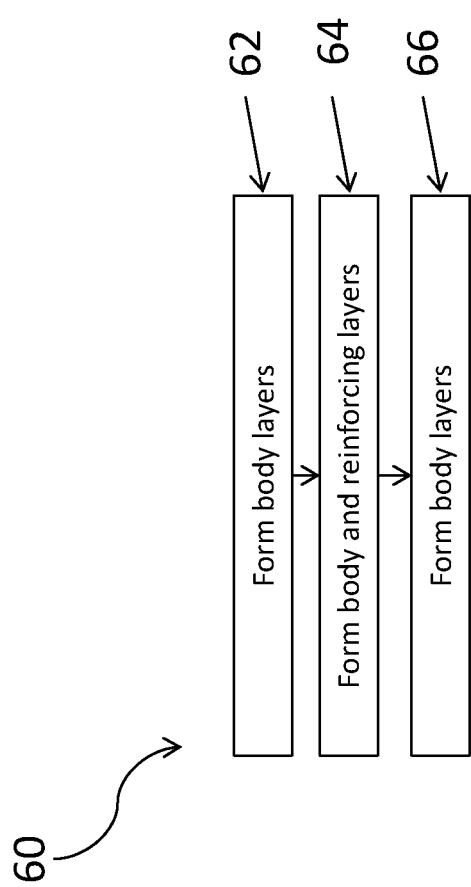
FIG. 8 is a flow diagram generally conveying an embodiment of a method of forming or making a fluid conduit according to teachings of the present disclosure

With embodiments, such as generally illustrated in FIGS. 6, 7, and 8, a method 60 of making or forming a fluid conduit 10 may include forming one or more portions of a fluid conduit 10 via a plurality of layers 50, such as, for example, via additive manufacturing and/or three dimensional (3D) printing. A method 60 of forming a fluid conduit 10 may include forming one or more layers (e.g., layers $50_1$, $50_2$) that may include portions of a body 20 (step 62). The method 60 may include forming one or more layers (e.g., layers $50_3$, $50_4$) that may include portions of the body 20 and/or portions of a reinforcing portion 30, such as a grid structure 32 (step 64). The method 60 may include forming one or more additional layers (e.g., layers $50_5$, $50_6$) that may include a portion of the body 20 and may not include portions of the reinforcing portion 30 (step 66).

With embodiments, some or all of a fluid conduit 10 may be formed as a single, unitary, and/or monolithic component (which may be referenced herein simply as "monolithic"). For example and without limitation, a body 20 and one or more reinforcing portions 30 may be formed as a monolithic component. Other designs may, for example, include separately forming a body 20 and a reinforcing portion 30, and connecting the body 20 and the reinforcing portion 30 together via fasteners, adhesive, and/or welding, among other methods.

In embodiments, a fluid conduit 10 may include one or more of a variety of materials. For example and without limitation, a body 20 and/or a reinforcing portion 30 may include a polymer, such as if the fluid conduit 10 is used in connection with aircraft cabin air flow. Additionally or alternatively, a body 20 and/or a reinforcing portion 30 may include a metal, such as if the fluid conduit 10 is used in connection with high temperature aircraft bleed air.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A fluid conduit, comprising:
   a body;
   a reinforcing portion integrally formed with the body, the reinforcing portion extending from a surface of the body; and
   an electrical component connected to an outer surface of the body;
   wherein the reinforcing portion includes a grid structure having a plurality of cells, at least one cell having a fastener extending therethrough to connect the electrical component to the outer surface of the body.

2. The fluid conduit of claim 1, wherein the grid structure includes a plurality of beams defining the plurality of cells as rectangular cells.

3. The fluid conduit of claim 1, wherein the at least one cell is full or partially filled cell.

4. The fluid conduit of claim 3, wherein the at least one full or partially filled cell includes a recess or aperture for receiving the fastener.

5. The fluid conduit of claim 4, wherein the recess or aperture includes internal threads.

6. The fluid conduit of claim 1, wherein a thickness of the reinforcing portion is substantially the same as a thickness of the body.

7. The fluid conduit of claim 1, wherein a thickness of the reinforcing is configured to withstand a predetermined amount of bending stress.

8. The fluid conduit of claim 1, wherein a circumferential extent of the reinforcing portion is less than one-half of a circumference of the body.

9. The fluid conduit of claim 1, wherein the reinforcing portion is configured to function as a heat sink.

10. The fluid conduit of claim 9, wherein the reinforcing portion is configured to dissipate heat generated by the electrical component.

11. The fluid conduit of claim 1, wherein the body and the reinforcing portion comprise a polymer.

12. The fluid conduit of claim 1, wherein the body and the reinforcing portion include metal.

13. The fluid conduit of claim 1, wherein the body and the reinforcing portion are formed via additive manufacturing.

14. The fluid conduit of claim 1, wherein the body and the reinforcing portion are formed as a monolithic component.

15. The fluid conduit of claim 1, including a handle connected to the body and the reinforcing portion.

16. The fluid conduit of claim 1, wherein the surface is an inner surface.

17. The fluid conduit of claim 16, including a second reinforcing portion extending from the inner surface.

18. The fluid conduit of claim 17, wherein the second reinforcing portion is circumferentially spaced from the reinforcing portion.

19. The fluid conduit of claim 1, wherein an axial length of the reinforcing portion is less than an axial length of the body.

20. A method of forming the fluid conduit of claim 1, the method comprising forming a plurality of layers; wherein the plurality of layers includes a first layer that includes portions of the body and portions of the reinforcing portion, and a second layer that includes portions of the body and does not include portions of the reinforcing portion.

* * * * *